United States Patent [19]

Wynn

[11] Patent Number: 5,781,883
[45] Date of Patent: Jul. 14, 1998

[54] METHOD FOR REAL-TIME REDUCTION OF VOICE TELECOMMUNICATIONS NOISE NOT MEASURABLE AT ITS SOURCE

[75] Inventor: Woodson Dale Wynn, Basking Ridge, N.J.

[73] Assignee: AT&T Corp., Middletown, N.J.

[21] Appl. No.: 755,796

[22] Filed: Oct. 30, 1996

Related U.S. Application Data

[63] Continuation of Ser. No. 160,770, Nov. 30, 1993.
[51] Int. Cl.$^6$ .................................. G10L 3/02; G10L 9/00
[52] U.S. Cl. ........................... 704/226; 704/227; 704/201
[58] Field of Search .................................. 704/226, 227, 704/201

Primary Examiner—David R. Hudspeth
Assistant Examiner—Robert Louis Sax
Attorney, Agent, or Firm—Charles E. Graves

[57] ABSTRACT

A telecommunications network service overcomes the annoying effects of transmitted noise by a signal processing which filters out the noise using interactive estimations of a linear predictive coding speech model. The speech model filter uses an accurate updated estimate of the current noise power spectral density, based upon incoming signal frame samples which are determined by a voice activity detector to be noise-only frames. A novel method of calculating the incoming signal using the linear predictive coding model provides for making intraframe iterations of the present frame based upon a selected number of recent past frames and up to two future frames. The processing is effective notwithstanding that the noise signal is not ascertainable from its source.

18 Claims, 10 Drawing Sheets

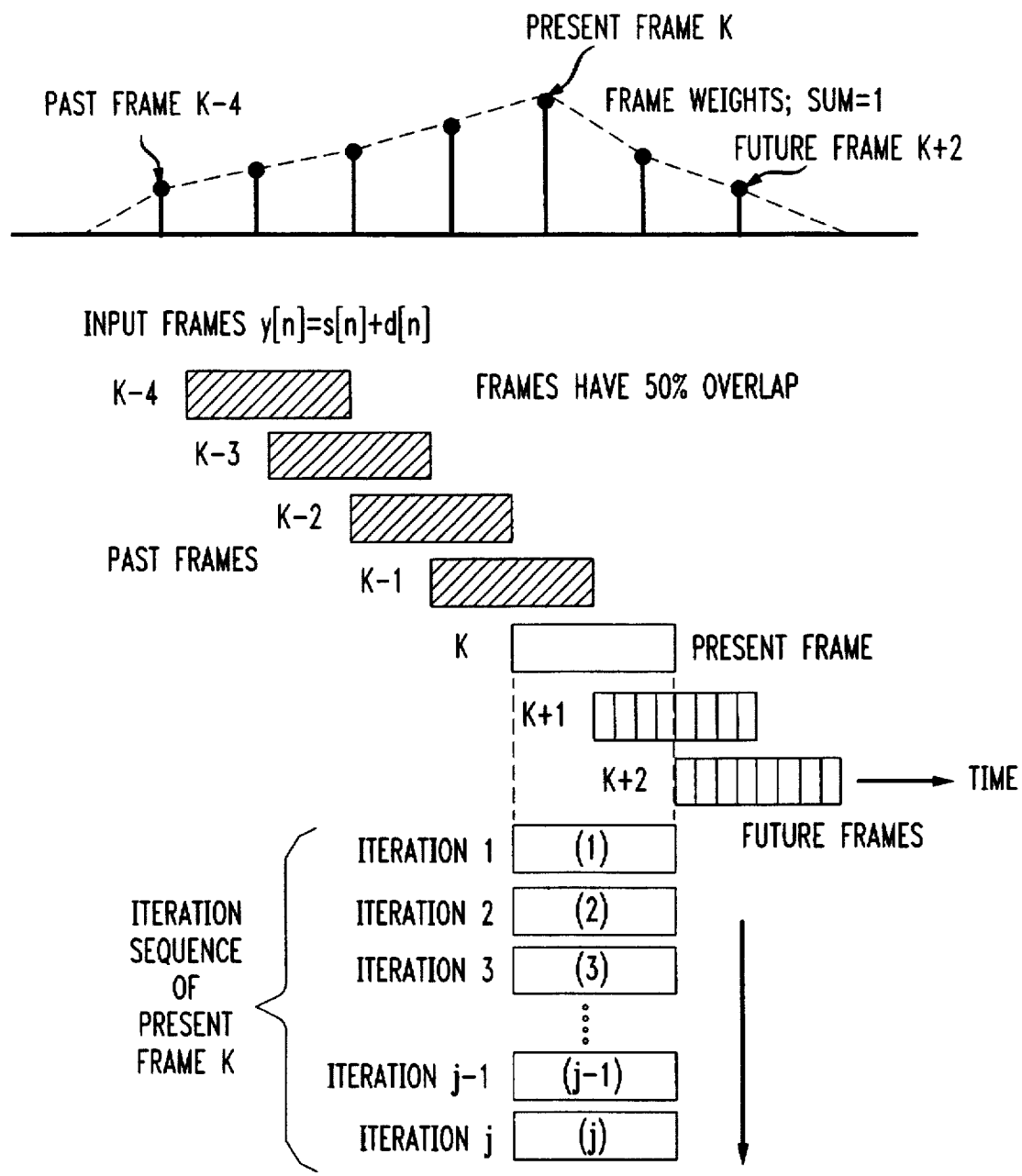

FIG. 5A

(A) SMOOTHING OPERATION

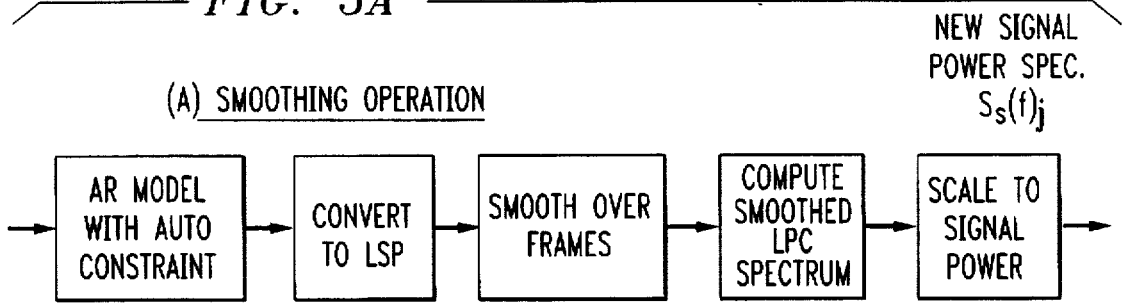

NEW SIGNAL POWER SPEC. $S_s(f)_j$

FIG. 5B

(B) RELAXATION OF LPC AUTOCORRECTION IN ITERATIONS

FOR A GIVEN FRAME K AND ITERATION j, THE LPC AR COEFFICIENTS ARE COMPUTED FROM AUTOCORRELATION MATRIX R AND CROSSCORRELATION VECTOR b:

$$a_j = R_j^{-1} * b_j$$

WHERE $R_j = cR_j + (1-c) R_{j-1}$

AND $b_j = cb_j + (1-c) b_{j-1}$ $c = 0.7$

FIG. 5C

(C) SMOOTHING OF THE LSP ROOTS ON THE UNIT CIRCLE

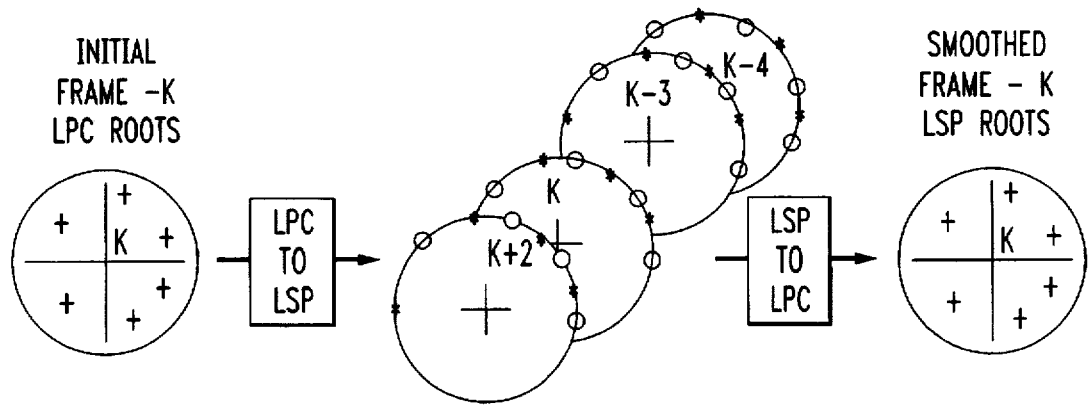

SMOOTH LSP P_ROOTS AND Q_ROOTS ACROSS FRAMES

FIG. 7

WEIGHT TABLES FOR LSP ROOT SMOOTHING PER FRAME SNR LEVEL

| WIN 0 FRAME NO. | LSP 1 | ROOT 2 | POSITION 3 | NO. 4 | - -> 5 |
|---|---|---|---|---|---|
| K-4 | 0.0 | .1429 | .1429 | .1429 | .1429 |
| K-3 | 0.0 | .1429 | .1429 | .1429 | .1429 |
| K-2 | .15 | .1429 | .1429 | .1429 | .1429 |
| K-1 | .25 | .1429 | .1429 | .1429 | .1429 |
| K | .1429 | .1429 | .1429 | .1429 | .1429 |
| K+1 | .1429 | .1429 | .1429 | .1429 | .1429 |
| K+2 | .1429 | .1429 | .1429 | .1429 | .1429 |

| WIN 4 FRAME NO. | LSP 1 | ROOT 2 | POSITION 3 | NO. 4 | - -> 5 |
|---|---|---|---|---|---|
| K-4 | 0.0 | 0.0 | 0.0 | 0.0 | 0.0 |
| K-3 | 0.0 | 0.0 | 0.0 | 0.0 | 0.0 |
| K-2 | 0.0 | 0.0 | .10 | .10 | .10 |
| K-1 | .20 | .20 | .20 | .20 | .20 |
| K | .70 | .70 | .60 | .60 | .60 |
| K+1 | .10 | .10 | .10 | .10 | .10 |
| K+2 | 0.0 | 0.0 | 0.0 | 0.0 | 0.0 |

| WIN 1 FRAME NO. | LSP 1 | ROOT 2 | POSITION 3 | NO. 4 | - -> 5 |
|---|---|---|---|---|---|
| K-4 | 0.0 | 0.0 | 0.0 | .05 | .05 |
| K-3 | 0.0 | 0.0 | .10 | .10 | .10 |
| K-2 | .15 | .15 | .15 | .15 | .15 |
| K-1 | .25 | .25 | .20 | .20 | .20 |
| K | .50 | .50 | .30 | .25 | .25 |
| K+1 | .10 | .10 | .15 | .15 | .15 |
| K+2 | 0.0 | 0.0 | .10 | .10 | .10 |

| WIN 5 FRAME NO. | LSP 1 | ROOT 2 | POSITION 3 | NO. 4 | - -> 5 |
|---|---|---|---|---|---|
| K-4 | 0.0 | 0.0 | 0.0 | 0.0 | 0.0 |
| K-3 | 0.0 | 0.0 | 0.0 | 0.0 | 0.0 |
| K-2 | 0.0 | 0.0 | 0.0 | 0.0 | 0.0 |
| K-1 | .20 | .20 | .20 | .20 | .20 |
| K | .80 | .80 | .70 | .70 | .70 |
| K+1 | 0.0 | 0.0 | .10 | .10 | .10 |
| K+2 | 0.0 | 0.0 | 0.0 | 0.0 | 0.0 |

| WIN 2 FRAME NO. | LSP 1 | ROOT 2 | POSITION 3 | NO. 4 | - -> 5 |
|---|---|---|---|---|---|
| K-4 | 0.0 | 0.0 | 0.0 | .05 | .05 |
| K-3 | 0.0 | 0.0 | .10 | .10 | .10 |
| K-2 | .10 | .10 | .15 | .15 | .15 |
| K-1 | .20 | .20 | .20 | .15 | .15 |
| K | .60 | .60 | .35 | .40 | .40 |
| K+1 | .10 | .10 | .15 | .10 | .10 |
| K+2 | 0.0 | 0.0 | .05 | .05 | .05 |

| WIN 6 FRAME NO. | LSP 1 | ROOT 2 | POSITION 3 | NO. 4 | - -> 5 |
|---|---|---|---|---|---|
| K-4 | 0.0 | 0.0 | 0.0 | 0.0 | 0.0 |
| K-3 | 0.0 | 0.0 | 0.0 | 0.0 | 0.0 |
| K-2 | 0.0 | 0.0 | 0.0 | 0.0 | 0.0 |
| K-1 | 0.0 | 0.0 | 0.0 | 0.0 | 0.0 |
| K | 1.0 | 1.0 | 1.0 | 1.0 | 1.0 |
| K+1 | 0.0 | 0.0 | 0.0 | 0.0 | 0.0 |
| K+2 | 0.0 | 0.0 | 0.0 | 0.0 | 0.0 |

| WIN 3 FRAME NO. | LSP 1 | ROOT 2 | POSITION 3 | NO. 4 | - -> 5 |
|---|---|---|---|---|---|
| K-4 | 0.0 | 0.0 | 0.0 | 0.0 | 0.0 |
| K-3 | 0.0 | 0.0 | 0.0 | .05 | .05 |
| K-2 | .10 | .10 | .15 | .10 | .10 |
| K-1 | .20 | .20 | .25 | .25 | .25 |
| K | .60 | .60 | .50 | .50 | .50 |
| K+1 | .10 | .10 | .10 | .10 | .10 |
| K+2 | 0.0 | 0.0 | 0.0 | 0.0 | 0.0 |

METHOD FOR REAL-TIME REDUCTION OF VOICE TELECOMMUNICATIONS NOISE NOT MEASURABLE AT ITS SOURCE

This application is a continuation of application Ser. No. 08/160,770, filed Nov. 30, 1993.

FIELD OF THE INVENTION

This invention relates to enhancing the quality of speech in a noisy telecommunications channel or network and, particularly, to apparatus which enhances the speech by continuously removing noise content through a novel use of linear predictive coding.

BACKGROUND OF THE INVENTION

In all forms of voice communications systems, noise from a variety of causes can interfere with the user's communications. Corrupting noise can occur with speech at the input of a system, in the transmission path(s), and at the receiving end. The presence of noise is annoying or distracting to users, can adversely affect speech quality, and can reduce the performance of speech coding and speech recognition apparatus.

Speech enhancement technology is important to cellular radio telephone systems which are subjected to car noise and channel noise, to pay phones located in noisy environments, to long-distance communications over noisy radio links or other poor paths and connections, to teleconferencing systems with noise at the speech source, and air-ground communication systems where loud cockpit noise corrupts pilot speech and is both wearing and dangerous. Further, as in the case of a speech recognition system for automatic dialing, recognition accuracy can deteriorate in the noisy environment if the recognizer algorithm is based on a statistical model of clean speech.

Noise in the transmission path is particularly difficult to overcome, one reason being that the noise signal is not ascertainable from its source. Therefore, suppressing it cannot be accomplished by generating an "error" signal from a direct measurement of the noise and then cancelling out the error signal by phase inversion.

Various approaches to enhancing a noisy speech signal when the noise component is not directly observable have been attempted. A review of these techniques is found in "Enhancement and Bandwidth Compresion of Noisy Speech," by J. S. Lim and A. V. Oppenheim, *Proceedings of the IEEE*, Vol. 67, No. 12, December 1979, Section V, pp 1586–1604. These include spectral subtraction of the estimated noise amplitude spectrum from the whole spectrum computed for the available noisy signal, and an iterative model-based filter proposed by Lim and Oppenheim which attempts to find the best all-pole model of the speech component given the total noisy signal and an estimate of the noise power spectrum. The model-based approach was used by J. H. L. Hansen, in "Constrained Iterative Speech Enhancement with Application to Speech Recognition," by J. H. L. Hansen and M. A. Clements, *IEEE Transactions On Signal Processing*, Vol. 39, No. 4, Apr. 1991, pp. 795–805, to develop a non-real-time speech smoother, where additional constraints across time were imposed on the speech model during the Lim-Oppenheim iterations to limit the model to changes characteristic of speech.

The effects of the earlier methods in the Lim/Oppenheim reference are to improve the signal-to-noise ratio after the processing, but with poor speech quality improvement due to the introduction of non-stationary noise in the filtered outputs. Even very low level non-stationary noise can be objectionable to human hearing. The advantage of smoothing across time frames in Hansen's non-real-time smoother is to further reduce the level of the non-stationary noise that remains. Hansen's smoothing approach provides considerable speech quality enhancement compared with the methods in Lim/Oppenheim reference, but this technique cannot be operated in real-time since it processes all data, past and future, at each time frame. Then the improvement cannot work effectively in a telecommunications environment. One of the improvements described below is to alter the Hansen smoother to function as a filter that is compatible with this environment.

SUMMARY OF THE INVENTION

The invention is a signal processing method for a communication network, which filters out noise using iterative estimation of the LPC speech model with the addition of real-time operation continuous estimation of the noise power spectrum, modification of the signal refiltered each iteration, and time constraints on the number of poles and their movements across time frames. The noise-corrupted input speech signal is applied to a special iterated linear Wiener Filter the purpose of which is to output in real-time an estimate of the speech which then is transmitted into the network.

The filter requires an accurate estimate of the current noise power spectral density function. This is obtained from spectral estimation of the input in noise gaps that are typical in speech. The detection of these noise-only frames is accomplished by a Voice Activity Detector (VAD). When noise-only is detected in the VAD, the filter output is attenuated so that the full noise power is not propagated onto the network.

When speech plus noise is detected in the time frame under consideration by the filter, an estimate is made as to whether the speech is voiced or unvoiced. The order of the LPC model assumed in the iterated filter is modified according to the speech type detected. As a rule, the LPC model order is M=Fs+(4 or 5) if voiced speech and M=Fs if unvoiced speech in the time frame, where Fs is the speech bandwidth in KHz. This dynamic adaptation of model order is used to suppress stray model poles that can produce time-dependent modulated tonelike noise in the filtered speech.

In accordance with another aspect of the invention, a tracking of changes in the noise spectrum is provided by updating with new noise-only frames to a degree that depends on a "distance" between the new and old noise spectrum estimates. Parameters may be set on the minimum number of contiguous new noise frames that must be detected before a new noise spectrum update is estimated and on the weight the new noise spectrum update is given.

These and further inventive improvements to the art of using iterative estimation of a filter that incorporates an adaptive speech model and noise spectral estimation with updates to suppress noise of the type which cannot be directly measured are hereinafter detailed in the description to follow of a specific novel embodiment of the invention used in a telecommunication network.

DESCRIPTION OF THE DRAWING

FIG. 2 is a diagram of a smoothing operation practiced in the invention;

FIGS. 5A, 5B and 5C are diagram depicting the interframe smoothing operation for LPC roots of the speech model; and the intraframe LPC autocorrelation matrix relaxation from iteration to iteration;

FIG. 7 is a table of smoothing weights for the LSP position roots to smooth across seven speech frames around the current frame;

DETAILED DESCRIPTION OF AN ILLUSTRATIVE EMBODIMENT

Figure 1A:
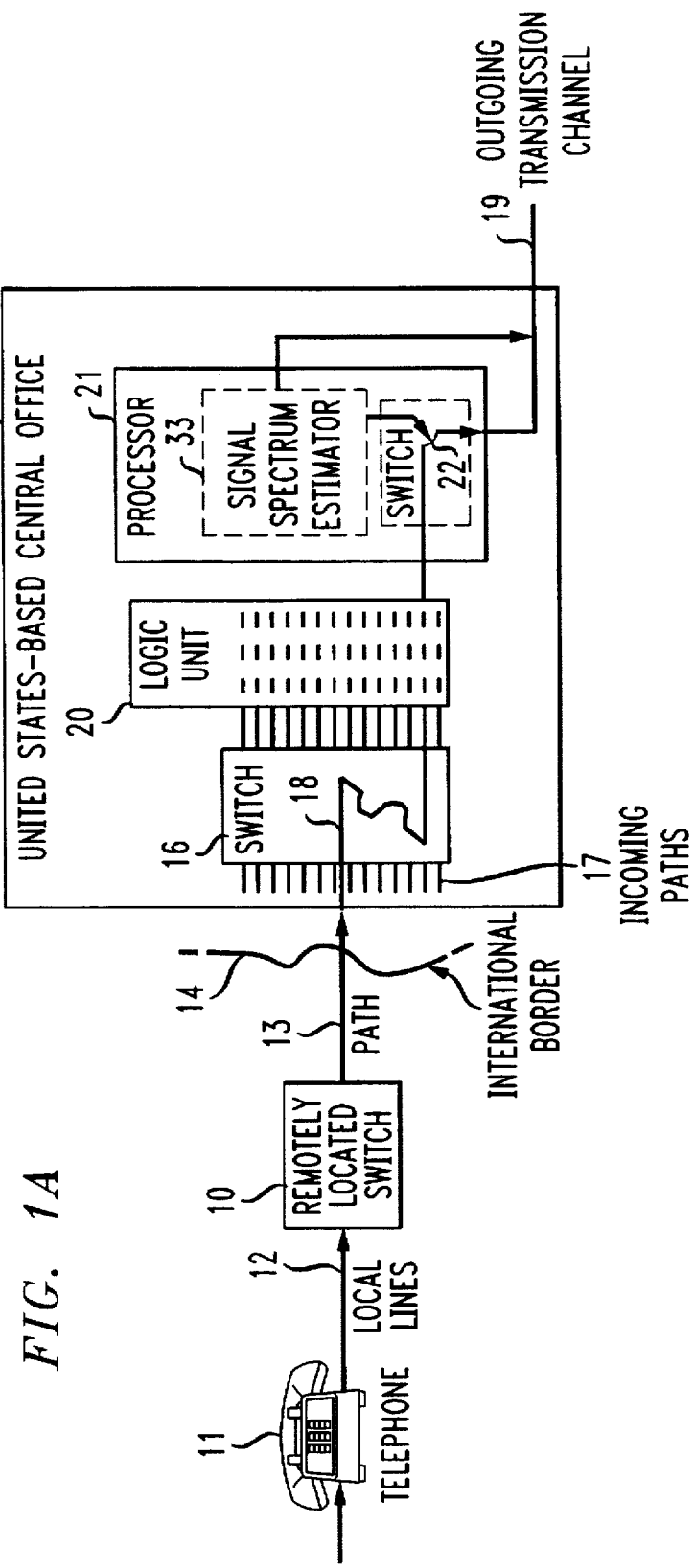
FIG. 1A is a diagram of an illustrative telecommunications network containing the invention.

The invention is essentially an enhancement process for filtering in-channel speech-plus-noise when no separate noise reference is available and which operates in real time. The invention will be described in connection with a telecommunications network, although it is understood that the principles of the invention are applicable to many situations where noise in an electronic speech transmission medium must be reduced. An exemplary telecommunications network is shown in FIG. 1, consisting of a remotely located switch 10 to which numerous communications terminals such as telephone 11 are connected over local lines such as 12 which might be twisted pair. Outgoing channels such as path 13 emanate from remote office 10. The path 13 may cross over an international border 14. The path 13 continues to a U.S. based central office 15 with a switch 16 which might be a No. 4ESS switch serving numerous incoming paths denoted 17 including path 13.

Switch 16 sets up an internal path such as path 18 which, in the example, links an incoming call from path 13 to an eventual outgoing transmission channel 19, which is one of a group 19 of outgoing channels. The incoming call from path 13 is assumed to contain noise generated in any of the segments 10, 11, 12, 13 of the linkage; the noise source, therefore, cannot be directly measured.

In accordance with the invention, a determination is made in logic unit 20 whether noise above a certain predetermined threshold is present in the switch output from path 13. Logic unit 20 also determines whether the call is voice, by ruling out fax, modem and other possibilities. Further, logic unit 20 determines whether the originating number is a customer of the transmitted noise reduction service. If logic unit 20 makes all three determinations, the call is routed to processor 21 by switch 22; otherwise the call is passed directly through to channel 19. While only one processor 21 is shown, all of the channels outgoing from switch 16 are connectable to other processors 21 (not shown).

The incoming signal from noisy path 13 may be processed to advantage by an analog filter (not shown) which has a frequency response restricted to that of the baseband telephone signal.

In the system discussed here, the noisy speech presented to processor 21 is digitized at an 8 KHz rate, and the time series are processed in frames. The frame size used is 160 samples (20 msec.) and a 50% overlap is imposed on these blocks to insure continuity of the reconstructed filtered speech.

Figure 1B:
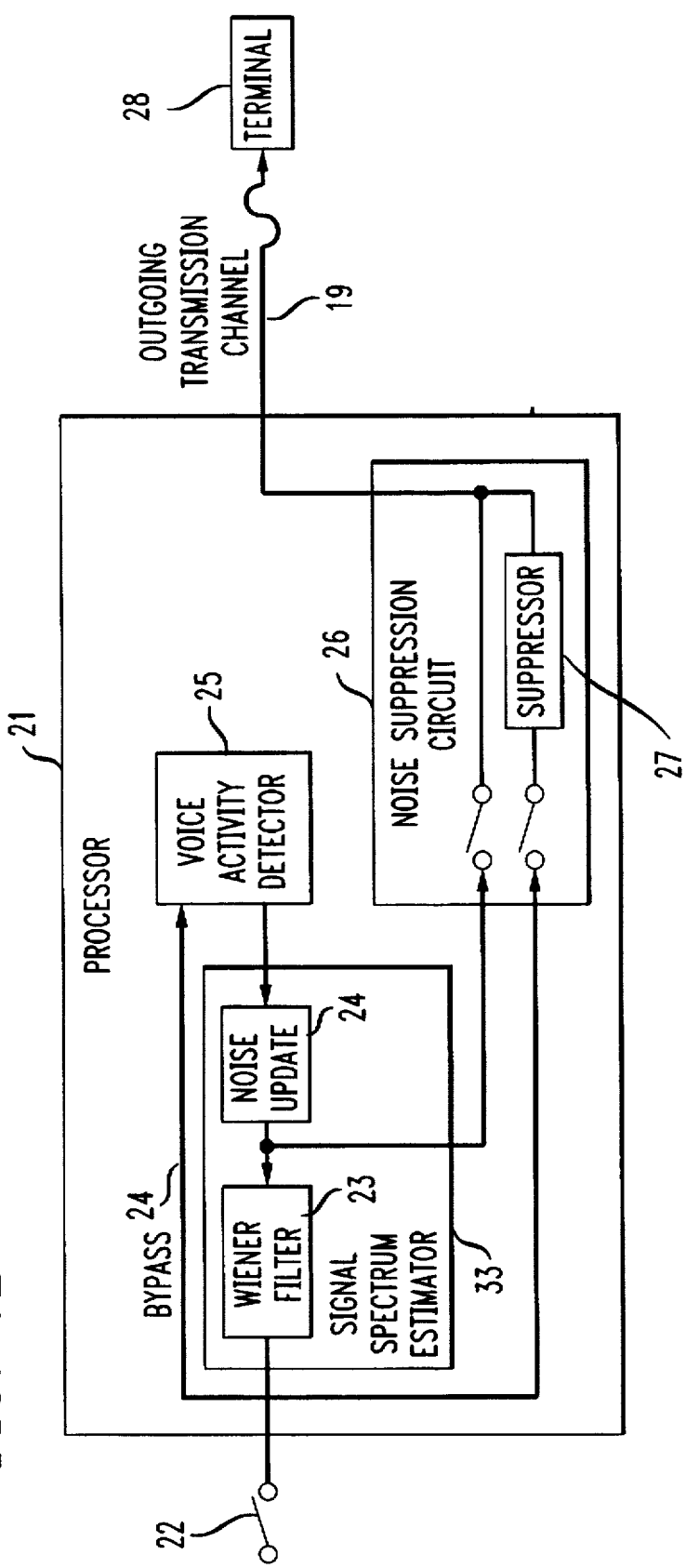
FIG. 1B is a signal processing resource.
Figure 3:
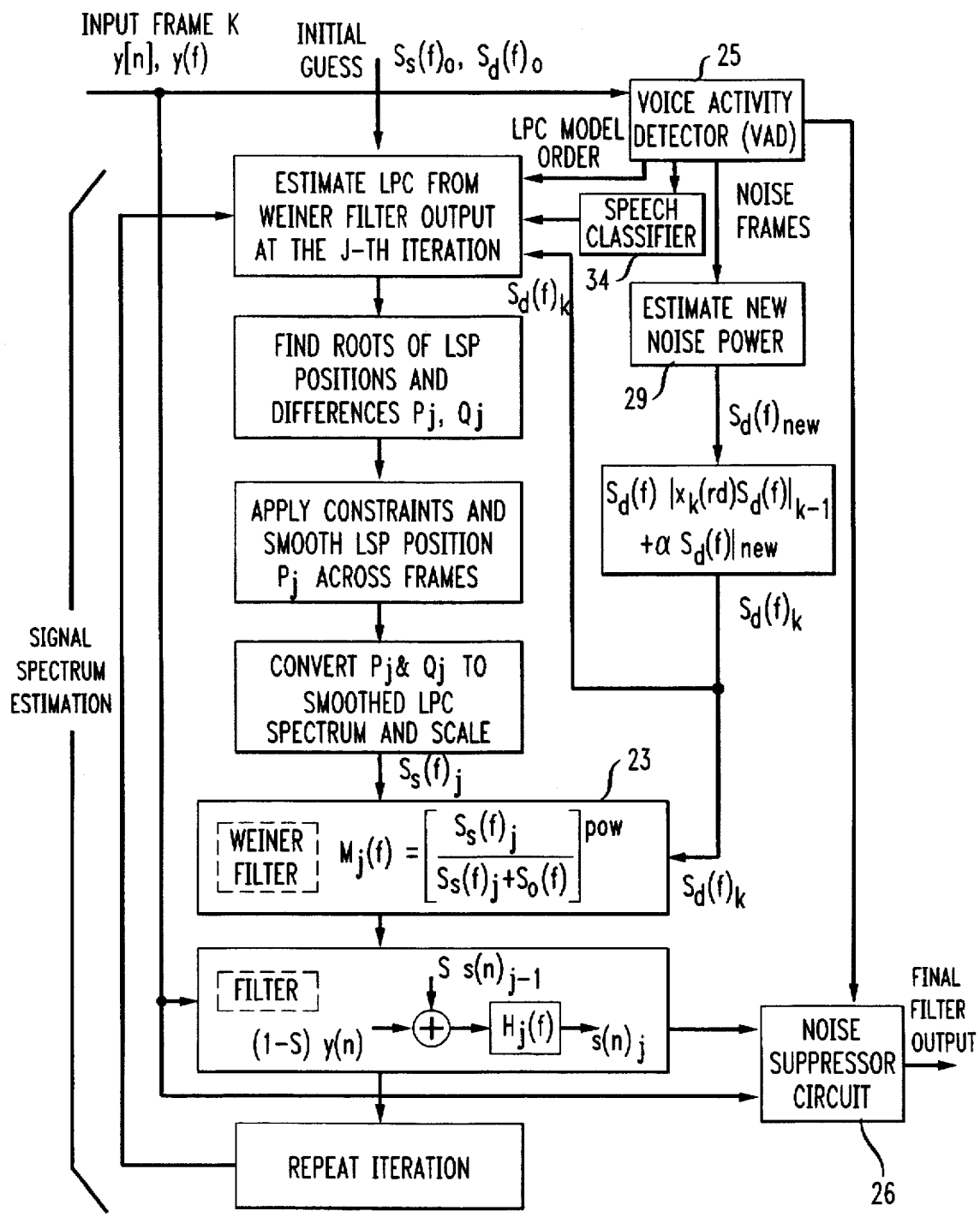
FIG. 3 is a flowchart showing the framework for speech enhancement.

Referring now to FIG. 1A, processor 21 consists of a Wiener Filter, where the signal spectrum for this filter is estimated by assuming an all-pole LPC model used as shown in FIG. 3 and iterating each frame to get the unknown parameters. Wiener Filter 23 to which the noisy calls are routed, is an element of a signal spectrum estimator 33 as shown in FIG. 3. The call also is routed via bypass 24 to the Voice Activity Detector (VAD) 25, which continuously detects noise or speech-plus-noise frames and determines if a speech frame is voiced or unvoiced. The required noise spectrum to be used in the Wiener Filter 23 is estimated from noise-only frames detected by the VAD 25.

When a processed frame is detected as noise only, VAD 25 signals a noise suppression circuit 26 to switch in a suppressor 27. In this mode, the noise-only input to filter 23 is attenuated substantially before its entry to the outgoing path 19 to the far-end listener at terminal 28. Additionally, when a noise-only frame is detected, the VAD 25 signals a noise weight update function 29 associated with signal spectrum estimator 33 to make a new noise spectral estimate based on the current noise frames and to weight it with the previous noise spectral estimate. Noise spectrum estimation is further described hereinafter and in FIG. 10.

When speech is detected by the VAD 25, input to noise suppressor circuit 26 is switched to such that the filtered speech is passed to the outgoing transmission channel 19. In addition, the order of the LPC speech model for the iterated Wiener Filter 23 is set in processor 21 at 10-th order if voiced speech is detected and at 4-th to 6-th order for an unvoiced speech frame. The motivation for this adaptive order of speech model is that the iterative search for the LPC poles can result in false formants in parts of the frequency band where the ratio of signal power spectrum to noise power spectrum is low. This results in noise tones of random frequency and duration in the filtered output that can be objectionable to the human ear, even though they are very low level relative to the average signal amplitude. Hence, since the LPC order typically needed for unvoiced speech is only half that of voiced speech for the bandwidth of interest, and since unvoiced speech is usually weaker than voiced speech, it is important to modulate the LPC order such that the speech model is not over specified.

Figure 4:
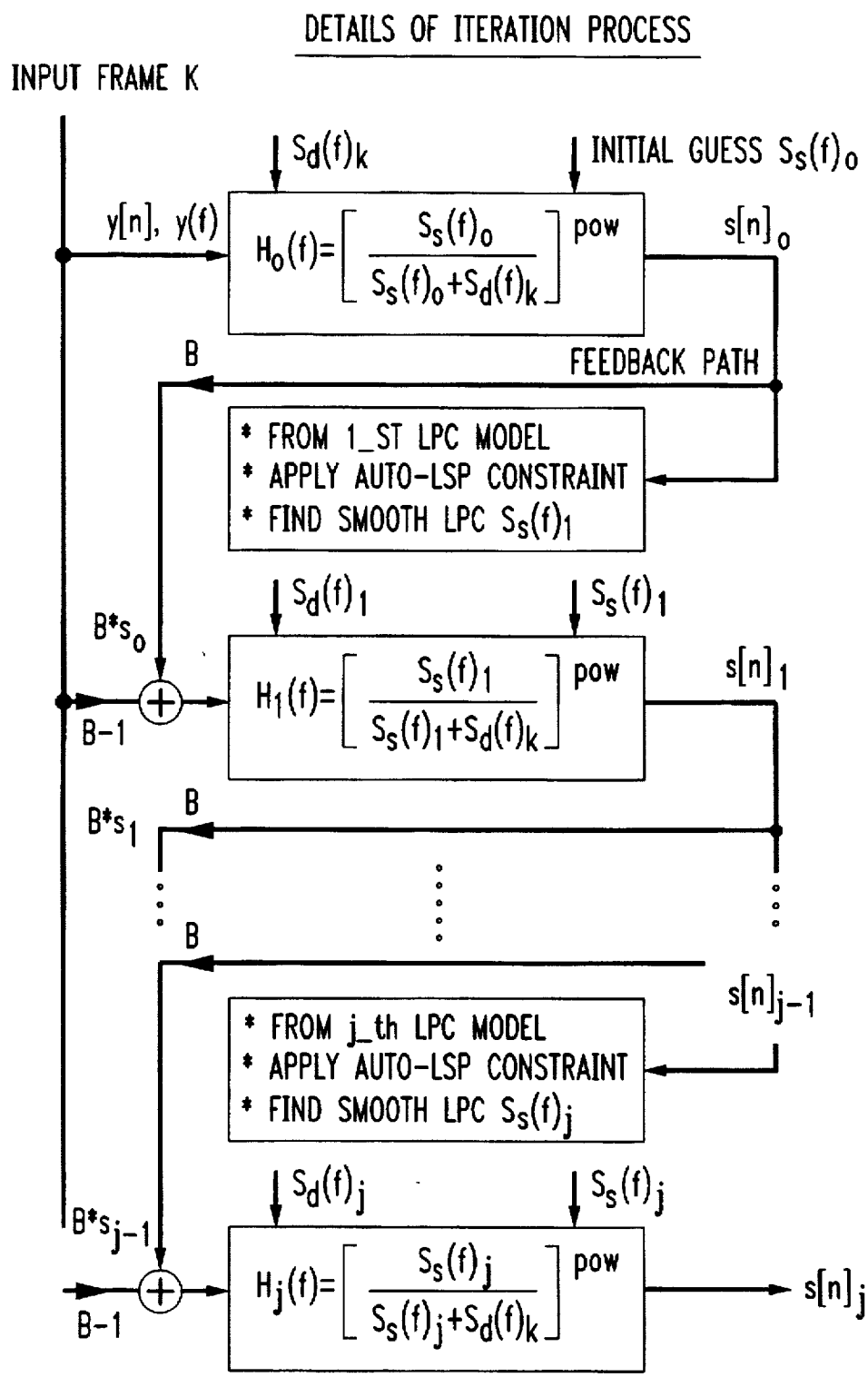
FIG. 4 is a diagram of apparatus which generates the iteration sequence for constrained speech enhancement.

The processes practiced in accordance with the steps of FIGS. 3 and 4 are based on the available filter approach in the Lim/Oppenheim reference and on the interframe and intraframe smoothing applied by J. H. L. Hansen to improve the iterative convergence for his non-real-time AUTO-LSP Smoother discussed in the Hansen/Clements reference. Variations realized by the present invention added thereto. Filter 23 operates on an incoming noisy speech signal to obtain the approximate speech content. The filter operation will now be described.

SIGNAL-MODEL SMOOTHING ACROSS ADJACENT TIME FRAMES

If the speech is not already in digital form, processor 21 contains an incoming signal analog-to-digital converter 30, which generates frame blocks of sampled input. Frame size of 160 samples, or 20 msec., is a time duration sufficient for speech to be approximated as a statistically stationary process for LPC modeling purposes. The iterated Wiener Filter and the LPC model of the speech process used as one component of processor 21 are based on a stationary process assumption. Hence, it is significant that the frames are processed in these short time blocks.

Referring now to FIG. 2, there are shown four past frames denoted k–4, k–3, k–2, k–1; the current frame, k; and two future frames k+1, k+2. The input signal plus noise may be expressed by y[n]=s[n]+d[n], where y is the available input sample, and s and d are the signal and noise parts. The samples are blocked into frames which overlap substantially, for example, by 50%. The data blocks are each weighted by a time window, such as the Hanning window, so that the sum of the overlapped windowed frames correctly spaced in time will add to give the original input time series. The use of a window reduces the variance in the LPC model estimated for a data frame, and frame overlap provides a continuity in the reconstructed filtered signal output to channel 19 in FIG. 1A.

As in the iterative AUTO-LSP smoother in the Hansen/Clements reference, there are two types of constraints for the present invention that are applied at each iteration of the Wiener Filter during the processing of the current frame of input data. These are the LPC Autocorrelation matrix relaxation constraint applied at each intraframe iteration of the current frame, and the interframe smoothing of the current frame's LPC speech model pole positions across the LPC pole positions realized at each iteration for adjacent past and future frames. The LPC pole constraints are not applied directly since these occur as complex numbers in the Z-plane, and the proper association to make of the complex pole positions for interframe smoothing is not clear. An indirect but simpler approach is possible by using an equivalent representation of the LPC poles called the Line Spectral Pair (LSP), the details of which are discussed in the Hansen/Clements reference and in *Digital Speech Processing, Synthesis, and Recognition*, by S. Fururi, Marcel Dekker, Inc., New York, N.Y., 1989, Chapter V. The N-th order LPC model pole positions are equivalently represented by a set of N/2 LSP "position" roots and N/2 LSP 'difference' roots that lie on the Unit Circle in the complex Z-plane. The utility of this equivalent LSP representation of the LPC poles is that lightly damped formant locations in the signal's LPC model spectrum are highly correlated with the LSP position roots, and the bandwidths of the LPC spectrum at these formants are highly correlated with the LSP difference roots. For a stable LPC model, the two kinds of LSP roots will lie exactly on the Unit Circle and will alternate around this circle. The ordering in position of LSP roots is obvious, and their smoothing across time frames is much simpler than in the smoothing of complex LPC roots. In summary, the LPC poles at each iteration of the current frame being filtered are smoothed across LPC poles at the same iteration in adjacent frames by smoothing the equivalent LSP position roots and by applying a lower bound on the minimum distance of a "difference" root to adjacent "position" root. The latter bounding restrains the sharpness of any LPC model's formants to be speech like.

The invention calls for performing the LSP position smoothing across nearby contiguous time frames, but in the filter implemented for real-time application in a communication network, only a few frames ahead of the current frame being filtered can be available. For 20 msec. frames with 50% overlap, the minimum delay imposed by using two future frames as indicated in FIG. 2 is 30 msec. Even this small delay may be significant in some communication networks.

The filter discussed here assumes four past frames and two future frames for smoothing. Although the entire past frames are available, only those correlated with the current frame should be used.

ITERATION PROCESS

The constrained iterative steps performed for the current frame K are shown in FIG. 3 with the iteration 1, . . . , J details indicated in FIG. 4. The Wiener Filter-LSP cycle is initiated by filtering the input block y[n] in the frequency domain, by the Wiener Filter 23 (hereinafter, "WF") where the signal and noise power spectral estimates used are $C.S_y(f)$ and $S_d(f)$. That is, the initial filter's signal spectrum is the total input spectrum scaled by C to have the expected power of the signal: $P_{signal}=P_{total}-P_{noise}$. After initialization, the loop in FIG. 3 performs of the following steps for iterative filtering of frame K;

(1) Start the iteration loop by estimating the LPC parameters of the WF output signal in the Time Domain where the LPC autocorrelation calculation is subject to a relaxation over autocorrelation values of previous iterations for the frame. This relaxation step attempts to further stabilize the iterative search for the best speech LPC model. This is discussed below in conjunction with FIGS. 5A, 5B and 5C.

(2) From the LPC model found in (1) at iteration j for speech frame K, solve for the LSP position roots $P_j$ and difference roots $Q_j$. This requires the real-root solution of two polynomials each of one-half the LPC order.

(3) Smooth the LSP-position roots $P_j$ for the current frame K across adjacent frames as indicated in FIG. 2 and FIG. 5c, and constrain the LSP difference roots $Q_j$ away from the smoothed $P_j$ roots. Each difference root $Q_j$ is constrained to be more than a minimum distance $D_{min}$ away from its closest smoothed $P_j$ root. This prevents the smoothed LPC pole positions from being driven to the Unit Circle of the complex Z-plane. This "divergence" was a problem in the Lim-Oppenheim iterative filter of the Lim/Oppenheim reference that was addressed in the smoother in the Hansen/Clements reference. The constraint is desirable for realistic speech transmission. The value $D_{min}=0.086$ radians has been used in telecommunications tests of the method.

(4) Convert the smoothed LSP roots to smoothed LPC parameters, compute the LPC signal model power spectrum $S_s(f)_j$ scaled such that the average power equals the current K_th frame estimated signal power: $P_{signal}=P_{total}-P_{noise}$.

(5) Use the smoothed LPC model signal spectrum $S_s(f)_j$ and the current noise power spectrum estimate $S_d(f)$ to construct the next iteration's Wiener Filter $H_j(f)$ as shown in FIG. 3 and FIG. 4. We use the term Wiener Filter loosely here since this filter is the usual non-casual WF raised to a power pow. Values for pow between 0.6 and 1.0 have been used in telecommunications tests of the method. The larger pow is the greater the change that occurs with each iteration, but with smaller pow the iterative search for the signal component should be more stable.

(6) Filter a combination of the previous iterations WF time-series output $s_{j-1}[n]$ and the original input data y[n] with the current $H_j(f)$ to get the next iteration of signal estimate $s_j[n]$. The linear combination used is $(1-B).y[n]+B.s_{j-1}[n]$, where $0 \leq B \leq 1$. If B=0, the filter becomes an unconstrained Lim-Oppenheim iterative filter, and if B=1 the input to the next WF is the previous WF output as done in the Hansen AUTO-LSP smoother in Hansen/Clements reference. Values of B between 0.80 and 0.95 have been used in most of the experiments on this filter. With these values of B, some desirable features of both the Lim-Oppenheim filter and Hansen smoother were combined. This weighting concept is new in the present method. It gives additional control of the amount of final noise content vs. the degree of high-frequency filtering observed in the iterated filtered speech.

The combining of features of the two previous signal-modeled iterative algorithms in the Lim/Oppenheim and Hansen/Clements references, specifically the weighted combination of Wiener Filter inputs each iteration, has been found subjectively to result in a less muffled sounding speech estimate, with a trade-off of slightly increased residual noise in the output. Combining is shown in FIGS. 3 and 4, where it is seen that the input signal to the FILTER at the j__th iteration is the TOTAL INPUT y[n] and the Wiener Filter OUTPUT $s|n|_{j-1}$ from the (j−1)__th iteration.

(7) In the present implementation of the method the number of iterations intra is an input parameter determined by experiment. For the results obtained in experiments, a value of 4 to 7 intraframe iterations were used in combinations [Intra, pow] such as [7, 0.65], [5, 0.8], and [4, 1.0] where values of the feedback factor B were between 0.80 and 0.95. The best values depend on the noise class and speech type. For broad band flat noise, intra=6 may be typical while only 4 or 5 iterations may suffice when the noise power spectrum is heavily biased below 1 KHz of the [0, 4 KHz] voice-band spectrum.

An important aspect of the invention that is illustrated in FIG. 1A, item 25, and also in FIG. 3 is the multiple application of a Voice Activity Detector (VAD), to both detect noise-only frames and to determine the best model order to apply in each frame by detecting voice or unvoiced speech if speech is present. As noted before, the best order for a LPC speech model differs for voiced and unvoiced speech frames. Also, as noted earlier, the noise spectrum is updated only when no voice signal is detected in a sufficient number of contiguous frames. During a time interval when noise only is detected, noise suppressor 27 in switch 26 is activated to attenuate the outgoing signal, and the Wiener Filter 23 is then inactive. If, however, speech is detected, then switch 26 switches the output of signal estimator 33 to the output channel 19. Further the class of speech, voiced or unvoiced, conditions the order of the LPC speech model to be used in the iterations. Also, the detection of change between the three possible states, noise-frame voiced-frame and unvoiced-frame, causes the LSP history for past frames K−4, K−3, K−2, and K−1 to be reinitialized before application of smoothing to the current K__th frame. This is both necessary and logical for best speech filtering since the purpose of smoothing across past time frames is to average disparate noise by making use of the short term stationary of speech across the frames averaged.

FRAME PROCESSING

Figure 6A:
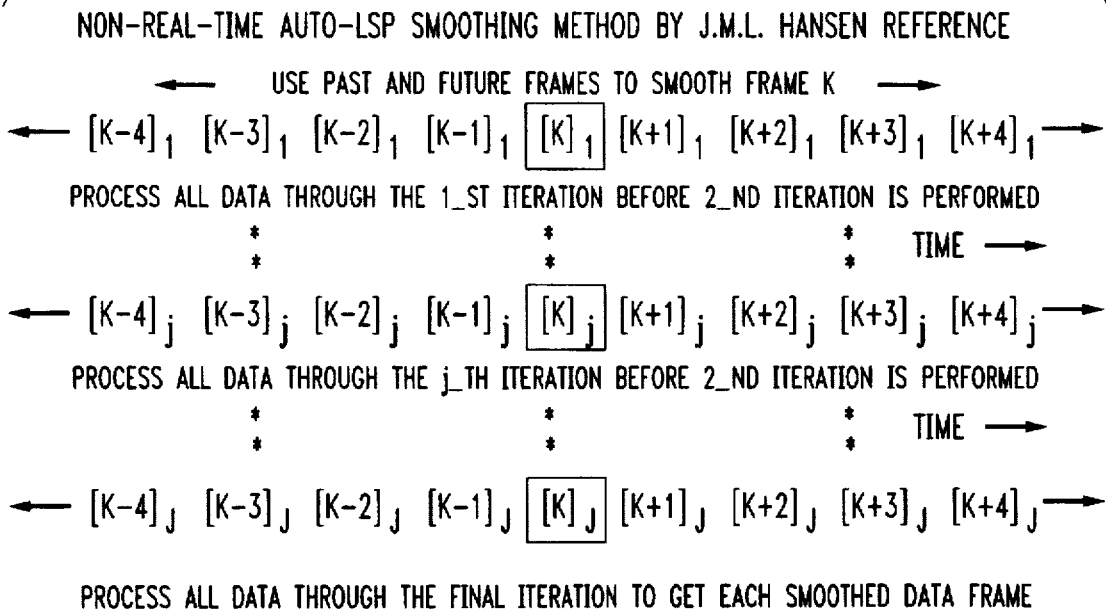
FIG. 6a is a diagram showing a preexisting method for updating each iteration of the current frame.
Figure 6B:
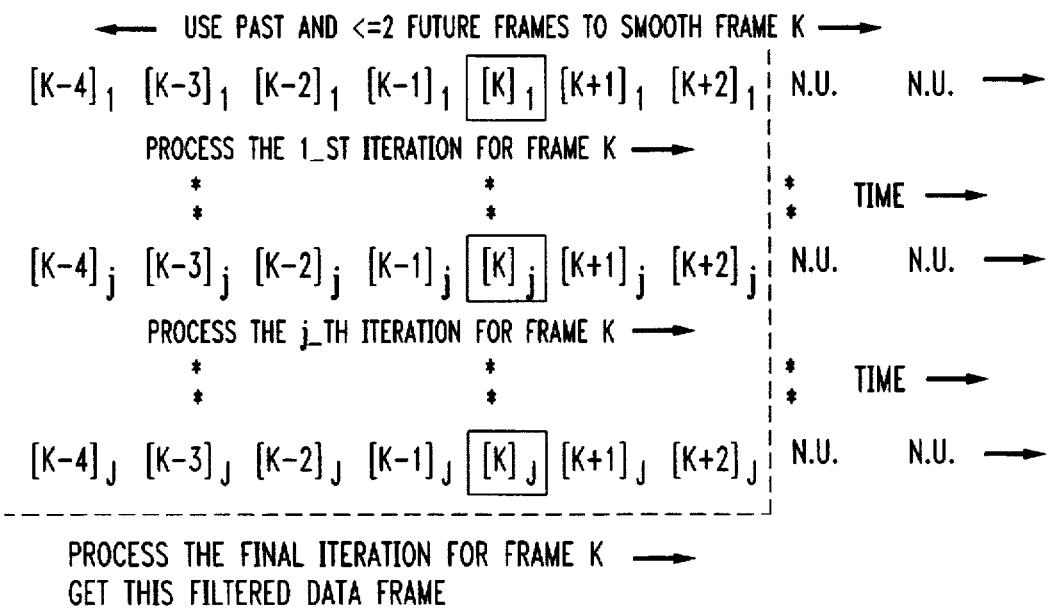
FIG. 6b is a diagram showing the improved method used for updating each iteration of the current frame.

FIG. 6A shows a non-real time smoothing method used by J. L. Hanson, referred to in the Background of the Invention herein. The method of processing the frames to achieve real-time operation of Wiener Filter 23 is shown in FIG. 6b. The K__th frame is assumed to be the present time reference point with frames K−4,K−3,K−2,K−1 the previously processed and archived frames while frames K+1 and K+2 are the available future frames. As in the smoothing approach in the Hansen/Clements reference, signal spectrum estimator 33 smoothes the LSP roots of the K__th frame speech model with those of the past and future frames at each K__th frame iteration by using the past frame LSP histories at the iteration number in process. However, unlike the non-real-time smoother in Hansen/Clements reference, the invention uses only two future frames and also stores the required past-frame LSP histories during the iterations done for each frame so that it accumulates these histories for the previous four frames to be smoothed with the current frame during the intraframe iterations. As in the method of Hansen/Clements reference, the weights are tapered across the frames and the taper from each LSP foot depends on the current frames SNR as well as the SNR history up to this K__th frame.

Another improvement in the invention is the use of table lookup for the frame LSP weights to be applied across frames. Weight tables applied in the invention are of the type shown in FIG. 7, whereas the weights required in Hansen/Clements reference are obtained by time-consuming formula computations. The values applied in the tables in FIG. 7 can be easily and independently adjusted, unlike the constraints imposed by the formula used in Hansen/Clements reference. The speech-frame thresholds at which a weight vector are applied to a particular LSP root is switched from one table to another are selected independently. The general strategy in constructing smoothing vectors is to apply more smoothing to the higher order LSP positions (i.e. higher formant frequencies) as indicated reading left to right in these tables. This is due to the greater influence of noise at given SNR observed on the higher order LSP speech positions. Another trend imposed on the table values is that smoothing is broad and uniform when the frame SNR is low and is decreased as SNR is increased to the point where no smoothing is applied at high SNR. This trend is due to the decreasing effect of noise on the filtered speech as frame SNR is improved. The frame SNR thresholds used to switch from one table of weight vectors to another are presently selected as multiples of the running estimate Npow of the noise power estimated using the VAD. The increasing thresholds used are Th1=2.Npow for change from table Win1 to Win2, Th2=3.Npow from table Win2 to Win3, Th3=7.Npow from table Win3 to Win4, Th4=11.Npow from table Win4 to Win5, with Win0 imposed if a sufficiently long run of low SNR frames occurs.

USE OF VOICE ACTIVITY DETECTION

Figure 10:
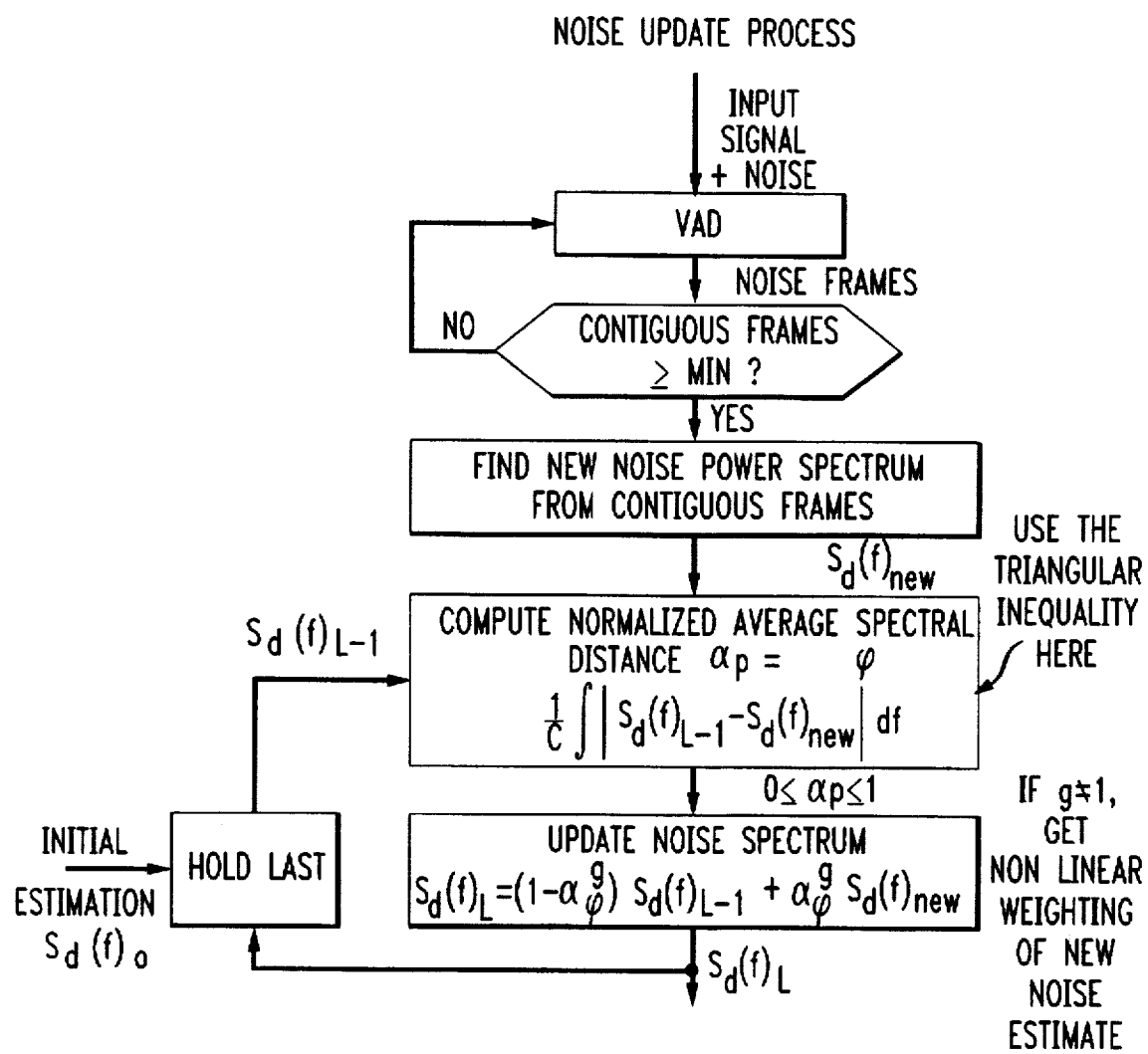
FIG. 10 is a description of the steps used to update the required noise spectrum used in the Wiener Filter.

Estimating the noise power spectral density $S_d(f)$ from noise-only frames using a voice activity detector (VAD), in accordance with the invention, provides an advantage. The filter process outlined in FIG. 3 is based on the assumption that the noise present during speech has the same average power spectrum as the estimated $S_d(f)$. If the noise is statistically wide-sense stationary, noise estimates would not need to be updated. However, for the speech enhancement applications illustrated herein, and also for many other transmitted noise reduction applications, the noise energy is only approximately stationary. In these cases, a running estimate of $S_d(f)$ is needed. Accordingly, a VAD such as detector 25 in FIG. 1B, having good immunity to noise at the operating SNR is used to identify when speech is not present. Noise-only frames detected between speech segments are used to update the noise power spectrum estimate, as shown in FIG. 10. One suitable VAD for use in the FIG. 1B application is obtained from the GSM 06.32 VAD Standard discussed in "The Voice Activity Detector for the PAN-EUROPEAN Digital Cellular Mobile Telephone Service," by D. K. Freeman et al., in IEEE Conf. ICASSP. 1989, Setion S7.6, pp. 369–372.

Figure 8:
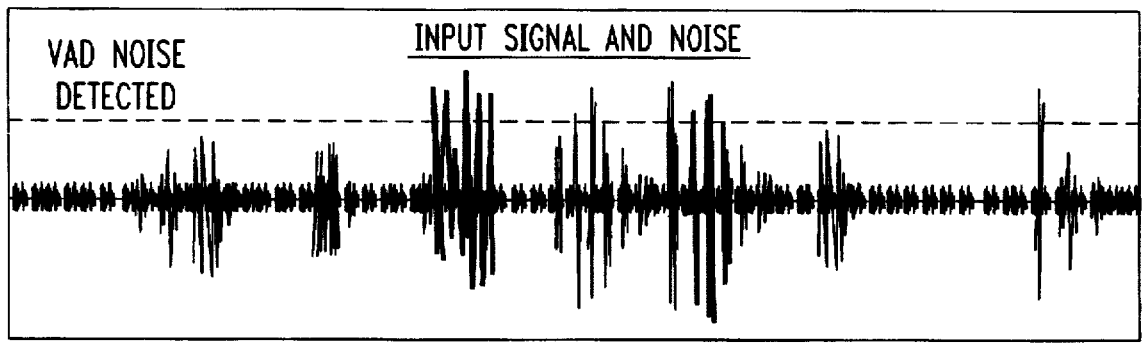
FIGS. 8 and 9 are signal traces showing aspects of the noise estimator.
Figure 9:
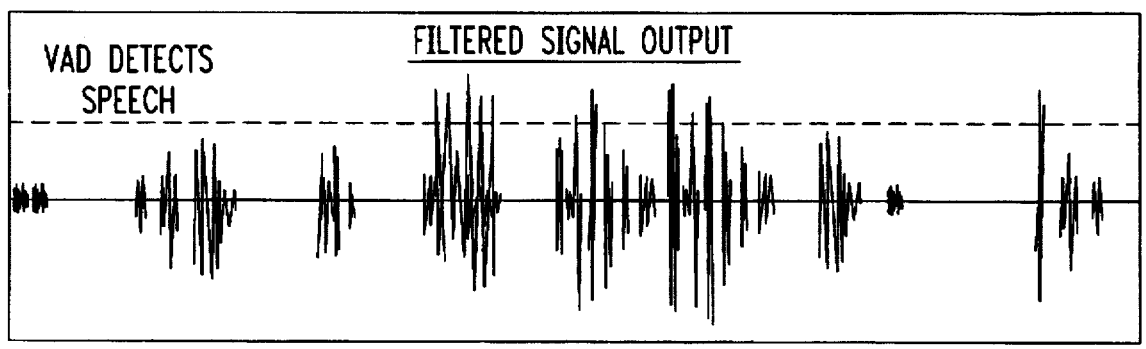

The pre-filtered and post-filtered speech examples shown in of FIGS. 8 and 9 indicate how voice activity detection is used to trigger attenuation of the outgoing signal when no voice is detected. As discussed in the Freeman et al. reference, the activation of the VAD on a noise frame is a convoluted balance of detected input level and repeated frame decisions of "no speech" properties.

IMPROVED OUTPUT USING SPEECH CLASSIFIER

Advantageously, a VAD speech classifier decision may be incorporated in the front end of the LPC model step as shown by VAD speech classifier 34 in FIG. 3. This is because the parameter settings such as LPC order in the AUTO_LSP algorithm are best adjusted according to the speech class (voiced or unvoiced) which is being filtered in the currently processed frame. If the speech within the processed frame can be classified reliably in the presence of noise, the enhancement may be improved.

NOISE SPECTRUM ESTIMATION

In accordance with another aspect of the invention, and referring to FIG. 3 and FIG. 10, an improved sensitivity to changes in the noise signal spectra is provided by apparatus which updates spectrum $S_d(f)$ with new "noise-only" frames to a degree that depends on how different the new noise spectra estimate $S_d(f)_{new}$ is from the prior estimate $S_d(f)$. If $S_d(f)_{L-1}$ denotes the prior noise spectrum, the updated spectrum is $$S_d(f)_L = (1-A) \cdot S_d(f)_{L-1} + A \cdot S_d(f)_{new}$$

where $0 \leq A \leq 1$ is a normalized average of the error $|S_d(f)_{L-1} - S_d(f)_{new}|^p$ over the frequency band. Typical values for p are $1 \to 2$. When a new noise spectrum estimate is "near" the prior estimate shape, A is near 0, but when the two spectral shapes are very different, A will be nearer 1 and the new noise frames will be heavily weighted in $S_d(f)_L$. Noise-frame decisions are made by the VAD which is a relatively conservative estimator in the proper SNR range, hence the probability of correct noise decisions is high for SNR above 10 dB. The time between noise updates is not a parameter in this approach, only average spectral difference. In order to decrease the variance in estimating the spectrum $S_d(f)_{new}$ it is desirable to require a number of contiguous noise-frame decisions from the VAD 25 before and update is valid. In test of the enhancement, 5 or 6 contiguous noise-frames are required in order to update the spectrum.

ADDITIONAL COMMENTS ON THE AUTO-LSP IMPROVED ITERATIVE FILTER

As discussed previously, two types of constraints are used in the AUTO-LSP filter approach to improve the Lim-Oppenheim model-based iterative filter. These are the intraframe autocorrelation relaxation placed on the autocorrelation matrix which is computed for the LPC model each iteration, and the interframe smoothing over LSP roots that occurred in the iteration for the time frames around the frame being filtered. The constraint operations, performed each iteration, are shown in FIGS. 5A, 5B and 5C. The Smoothing Operation shows the order in which the constraints are to be applied during an iteration to obtain that iteration's Wiener Filter (WF) signal power estimate $S_s(f)_j$ from the previous iteration signal result $s[n]_{j-1}$. The iterative sequence of filtering the whole Signal+Noise $y[n]$ with the WF where at each iteration the new estimate of the signals spectrum is inserted into the WF model will, in theory, converge to the "best" signal estimate under the statistical assumptions imposed in the Lim/Oppenheim reference. In the real-world speech signal and noise classes of interest, the additional AUTO-LSP intraframe and interframe constraints assist the convergence and impose speech-like requirements on the signal spectrum in the WF. The intraframe autocorrelation relaxation is shown in FIG. 5B, where the desired LPC model parameters are denoted as a, the autocorrelation matrix of the latest signal estimate $s[n]_j$ is $R_j$, and $b_j$ is the cross-correlation vector in the Yule-Walker AR method. The proposed relaxation factor is c=0.7. The relaxation can be expanded to smooth over more than just the previous frame, but no significant advantage has been observed in doing this. The smoothing process is shown in FIG. 5C. Each large circle indicates the 5 Unit Circle in the complex Z-plane. For the K_th frame and iteration j, the symbol 'o' marks the LSP difference roots $Q_{Kj}$ and '*' marks the position roots $P_{Kj}$. For a LPC model that is Minimum Phase, the poles lie inside the Unit Circle and the $P_{Kj}$ and $Q_{Kj}$ will alternate along this circle. LSP smoothing is over the past and future frames, where the present set is $K-4, K-3, K-2, K-1, K, K+1, K+2$. Only the position roots $P_{Kj}$ are smoothed directly, and the difference roots $Q_{Kj}$ are forced to track the smoothed $P_{Kj}$. An inverse step gives the smoothed, scaled LPC signal model's spectrum $S_s(f)_j$. The complex roots of an equivalent LSP representation are simply the solution of a pair of real-root polynomials each with half the order of the original LPC polynomial, as is fully described in the Hansen/Clements and Furui references.

A clear computational advantage exists in smoothing LSP roots in the AUTO-LSP approach rather than directly smoothing the complex domain roots of the LPC autoregressive models. Even though the LPC and LSP model representations are equivalent, a possible disadvantage of smoothing LSP roots across frames is that a nonlinear relationship exists between the LPC spectrum formant locations/bandwidths and the corresponding LSP position/ distance roots. Specifically, as LPC roots move away from the Unit Circle, LSP position roots do not identify well with the LPC formant frequencies or bandwidths. However, this nonlinear mapping does not seem to limit the effectiveness of constrained LSP roots in providing improved speech enhancement.

The described process is particularly effective when the noise is statistically wide-sense stationary during the time interval from the point of estimation of the noise power spectrum to the end of the Speech+Noise processed using this noise estimate. It seems to be most effective for signal-to-noise ratios above 10 dB SNR. For interference cases such as automobile road noise and aircraft cockpit noise where much of the spectral energy is at the lower part of the audio band, it may function usefully down to 5 dB SNR. For stationary tone-like noise such as In-Network hum, the filter has been operated with considerable success for SNRs below 0 dB when the VAD gives clear indication of the noise-only frames.

I claim:

1. In a telecommunications network carrying an incoming signal, said incoming signal having both speech and noise energy, a method for real-time processing of said incoming signal using an iterated filter operated as a Linear Predictive Coding speech model comprising filter-order adjustments and means for equivalently representing pole positions of said Linear Predictive Coding speech model with Line Spectral Pair position roots and difference roots, in which said iterated filter creates an estimate of the speech power spectrum component of said incoming signal for each current frame for transmission to said telecommunications network, said method comprising the steps of:

converting said incoming signal to a time-series of spectral domain data frames;

selecting from said time-series of data frames a subset of consecutive data frames including a group of past data frames, the current data frame and up to two future data frames;

performing a selected number of iterations upon said current data frame across said subset of data frames, each said iteration generating values of said Line Spectral Pair position roots and difference roots; said iterations comprising the steps of:

creating a succession of Wiener Filters in which the signal spectrum entering the initial said Wiener Filter includes a noise power spectrum estimate;

at each present iteration stage, determining the best current estimates of speech power spectrum and noise power spectrum, and summing the two said estimates to form a current said Wiener Filter; and summing a large fraction of the output of said current Wiener Filter with a small amount equal to 1 minus said large fraction of the unfiltered said incoming signal to create an input to the next said Wiener Filter;

during said iteration sequence, for each iteration smoothing said Line Spectral Pair root positions generated for said past data frames, with the Line Spectral Pair root position of said current frame, using values of Line Spectral Pair root positions calculated for the current iteration of said sequence;

creating estimates of said incoming speech power spectrum from the output of a succession of said iteration sequences of said current frames;

forming a noise-reduced speech signal based on said incoming speech power spectrum estimates; and transmitting said noise-reduced speech signal to said telecommunications network.

2. The method of claim 1, wherein the decimal equivalent of said large fraction is from 0.80 to 0.95.

3. The method of claim 2, wherein said step of determining the best current said estimate of noise power spectrum comprises:

detecting a succession of said data frames which according to a predetermined criterion contain only noise energy; and making and continuously updating said estimate of said noise power spectrum using only spectra of said data frames containing noise energy.

4. The method according to claim 3, wherein the step of making and continuously updating an estimate of said noise power spectrum further comprises the substeps of:

measuring differences in noise power spectrum between a new said noise power spectrum estimate and the prior said noise power spectrum estimate; and giving greater weight in said updating to the frames of said new noise power spectrum estimate by an amount proportional to said last-named differences.

5. The method in accordance with claim 4, wherein the step of making and continuously updating said estimate of said noise power spectrum is performed only when at least a small predetermined number of noise-only frames are detected.

6. The method according to claim 5, wherein said predetermined number of noise-only frames is five to six.

7. The method of claim 6, comprising the further steps of:

detecting in said data frames speech energy which according to predetermined criteria is voiced and speech energy which is unvoiced; and adjusting said Linear Predictive Coding speech model filter-order to substantially the 10th order in response to said detecting of said voiced speech energy.

8. The method of claim 7, comprising the further step of:

adjusting said Linear Predictive Coding speech model filter-order to substantially the 4th to 6th order in response to said detecting of said unvoiced speech energy.

9. The method of claim 8, comprising the further step of: connecting said noise-reduced speech signal to said network only in response to said detection of either voiced speech or unvoiced speech.

10. The method of claim 9, comprising the further steps of:

attenuating said estimate of said noise power spectrum; and passing said attenuated noise power spectrum estimate to said network when neither voiced nor unvoiced speech is detected.

11. The method of claim 10, comprising the further step of:

overlapping adjacent ones of said subset of consecutive data frames prior to performing said sequence of iterations.

12. The method of claim 11, wherein said adjacent data frames overlap by substantially 50%.

13. The process of claim 12, wherein said telecommunications network comprises a remote switch located on a first side of an international border, a central office containing a second switch located on an opposite side of said border, and a communications path between said remote switch and said second switch, said incoming signal having both speech and noise energy being received by said second switch.

14. The method of claim 13, wherein said subset of consecutive data frames includes up to four past frames.

15. The method in accordance with claims 1 or 14, comprising the further steps of:

prior to activating said real-time processing method, setting a transmitted incoming noise energy threshold;

determining whether noise energy above said threshold is present in said incoming signal;

determining whether said incoming signal contains any speech signal energy;

determining whether said incoming signal constitutes a call in said network involving a customer of noise-reduction service; and if and only if all three preceding said determinations are affirmative, activating said real-time processing method.

16. The method in accordance with claim 15, comprising the further steps of:

detecting a transition in said incoming signal from any one of the possible conditions of noise-only, voiced speech and unvoiced speech to another of said states; and before commencing said iterations on said current frame, reinitializing said Line Spectral Pair roots of said past four frames.

17. The method of claim 16, wherein said selected number of iterations number from four to seven.

18. The method of claim 17, further comprising constraining each said Line Spectral Pair difference root to be more than a minimum predetermined distance away from its closest said Line Spectral Pair smoothed position root.

* * * * *